(12) United States Patent
Steinmeyer et al.

(10) Patent No.: US 7,825,213 B2
(45) Date of Patent: Nov. 2, 2010

(54) METHOD OF MAKING A METAL TEREPHTHALATE POLYMER

(75) Inventors: Daniel Eric Steinmeyer, Chesterfield, MO (US); Alan Marc Levine, Monroeville, PA (US); James Matthew Williams, Latrobe, PA (US)

(73) Assignee: Chem Engineering Energy, LLC, Chesterfield, MO (US)

( * ) Notice: Subject to any disclaimer, the term of this patent is extended or adjusted under 35 U.S.C. 154(b) by 463 days.

(21) Appl. No.: 12/082,523

(22) Filed: Apr. 11, 2008

(65) Prior Publication Data

US 2009/0258993 A1     Oct. 15, 2009

(51) Int. Cl.
 *C08G 1/14*   (2006.01)
 *C08L 69/00*  (2006.01)
(52) U.S. Cl. .................. 528/489; 528/488; 525/439
(58) Field of Classification Search .......... 528/488, 528/489; 525/439
 See application file for complete search history.

(56) References Cited

U.S. PATENT DOCUMENTS

| | | |
|---|---|---|
| 4,952,636 A | 8/1990 | Morgan et al. |
| 4,983,688 A | 1/1991 | Jennings et al. |
| 5,164,458 A | 11/1992 | Jennings et al. |
| 5,254,666 A | 10/1993 | Benzaria |
| 5,380,593 A | 1/1995 | Jennings et al. |
| 5,446,112 A | 8/1995 | Hamilton et al. |
| 5,475,045 A | 12/1995 | Baker et al. |
| 5,545,746 A | 8/1996 | Benzaria et al. |
| 6,210,562 B1 | 4/2001 | Xie et al. |
| 6,833,485 B2 | 12/2004 | Nichols et al. |
| 6,835,861 B2 | 12/2004 | Nichols et al. |

FOREIGN PATENT DOCUMENTS

EP     0497662 A1     8/1992

OTHER PUBLICATIONS

Wan, Ben-Su et al., "Kinetics Depolymerization of Poly(ethylene terephthalate) in a Potassium Hydroxide Solution", Ind. Eng. Chem. Res. 2001, 40, 509-514.
P. Baker and R.F. Grossman, "Properties and Reactions of Metal Terephthalates", Journal of Vinyl Technology, vol. 11, No. 2, pp. 59-61, Jun. 1989.

*Primary Examiner*—Milton I Cano
*Assistant Examiner*—Gennadiy Mesh
(74) *Attorney, Agent, or Firm*—Eckert Seamans Cherin & Mellott, LLC; Arnold B. Silverman, Esquire (57) ABSTRACT

A method of making a metal-terephthalate polymer from polyester ethylene terephthalate includes reacting polyester ethylene terephthalate with a metal compound in a non-aqueous melt environment at an elevated temperature. The elevated temperature will be greater than 270° C., and preferably rises to a temperature of about 520° C. The method is preferably carried out at a low pressure. The method may be used in the recycling of passenger vehicle tire shreds to produce a carbon black rrich ppowder that is enriched in the metal-terephthalate polymer.

48 Claims, 2 Drawing Sheets

METHOD OF MAKING A METAL TEREPHTHALATE POLYMER

BACKGROUND OF THE INVENTION

1. Field of the Invention

The present invention relates to a method of making small anhydrous metal terephthalate (metal-TPA) polymeric crystals or fibers from polyester ethylene terephthalate and polyvalent metal compounds. In one embodiment, it involves pyrolysis of passenger vehicle tires. Polyvalent metal-terephthalate polymers are stable, repeating structures built around terephthalate frameworks, with polyvalent metals bonded to the carboxylic acid functions, thereby providing interconnections between the aromatic rings in the polymer chain.

2. Description of the Prior Art

It has been known to convert used passenger vehicle tires into useful carbon black powder, as well as byproducts through a pyrolysis process. See generally U.S. Pat. Nos. 6,835,861 and 6,833,485.

U.S. Pat. No. 4,952,636 discloses the use of polymeric hindered polyvalent metal salts of an aromatic polycarboxylic acid. It discloses zinc terephthalate providing a crosslinking reaction with carboxylated rubber. It also discloses the high-temperature stability of these polymers. See also U.S. Pat. Nos. 4,983,688; 5,164,458; 5,380,593; and 5,475,045.

U.S. Pat. No. 5,164,458 discloses a process for producing calcium terephthalate elongated fibers having an average particle size of about 100 mesh synthesized by an aqueous process.

U.S. Pat. No. 5,380,593 provides 9 examples of multistep aqueous based syntheses, for making calcium as well as zinc and barium terephthalate fibers. It adds the distinction that these are anhydrous fibers or rods and not hydrated plates as produced by simpler aqueous synthesis processes. The distinction is important because the hydrated plates do not function in most polymer systems because the release of water causes problems. Various sizes of the fibers are given, the smallest being 75 microns in length.

U.S. Pat. No. 5,446,112 discloses a multistep synthesis strategy for making metal terephthalates resins. It begins with an aromatic monocarboxylic acid which reacts with a metal oxide. Water is then distilled off followed by a reaction with a dialkyl ester of an aromatic acid. This yields a metal-terephthalate resin and a byproduct alkyl ester. No conditions are given for the final step. The byproduct alkyl ester is distilled away in this strategy. The only information on the form and purity of the resin product is that it contains less than 10 ppm of metal halide.

U.S. Pat. No. 5,254,666 is directed toward a reaction of polyester ethylene terephthalate with metal compounds to recover terephthalic acid, as well as the polyol of the polyester. The upper limit of temperatures employed is 180° C. The temperature cited is well below the melting point of polyester ethylene terephthalate. The examples mention potassium and sodium, which are monovalent and belong to the class known as alkali metals. The patent states that the product powder is dissolved in water. The patent discloses alkaline earth metals, which are polyvalent and would include calcium and magnesium, but the fact that the product dissolved in water, shows that the product could not have been a polyvalent metal polymer as discussed in the present invention.

U.S. Pat. No. 5,545,746 is also directed toward recovery of terephthalic acid, as well as the polyol of the polyester. It extends the temperature range up to 250° C., which is well below the melting point of polyester ethylene terephthalate. The examples only mention potassium and sodium. The patent discloses dissolving the product in water which again shows that the product could not have been a polyvalent metal polymer as discussed in the present invention.

The paper by P. Baker and R. F. Grossman, "Properties and Reactions of Metal Terephthalates," Journal of Vinyl Technology, Volume 11, No. 2, pp. 59-61, June, 1989 discloses the unique properties of polyvalent metal terephthalates. One unique property is their high thermal stability which results in high decomposition temperatures. Typically polyvalent metal terephthalates do not compose until about 600° C. to 700° C. The paper explains this unusual stability by showing the interlinked structure of the longchain polyvalent metal terephthalate molecules. The paper also makes the sharp distinction that although alkali metal (monovalent) terephthalate salts are water soluble, no polyvalent metal terephthalate exhibits more than trace solubility. Like the high thermal stability, the insolubility in water follows from the interlinked structure.

In spite of the foregoing known methods and compositions, there remains a very real and substantial need for an improved method of making anhydrous, metal terephthalate polymeric crystals to form polyester ethylene terephthalate and polyvalent metal compounds.

SUMMARY OF THE INVENTION

The present invention provides a simple process for making an anhydrous crystal of polyvalent metal-terephthalate polymer from polyester ethylene terephthalate. This is accomplished by reacting the polyester ethylene terephthalate with at least one polyvalent metal compound in a non-aqueous melt environment, at a temperature above the melting point of polyester ethylene terephthalate to establish the metal-terephthalate polymer. The metal compound may be provided in any of a number of forms, such as the metal itself or the oxide or hydroxide, for example.

Polyvalent metal-terephthalate polymers are organo-metallic polymers formed by polyvalent metals replacing the ethylene glycol group in polyester ethylene terephthalate. The metal may preferably be selected from a group consisting of Ca, Mg, Fe, Al, Se, Zn, Sr, and Ba.

Polyester ethylene terephthalate is a long chain-molecule made by reacting terephthalic acid with ethylene glycol while driving off the water of reaction. It grows by adding to the ends of short chains, and by short chains joining to make longer chains. When it hydrolyzes, the process reverses to yield shorter chains with reactive endgroups like those of terephthalic acid. These reactive ends then can react with metallic compounds.

In a preferred embodiment of the invention, a major portion of the reaction takes place within a first reaction zone, and the remainder occurs in a second reaction zone. While two reaction zones are involved, the invention is essentially a process wherein the components are mixed and the temperature is increased.

The reaction of the method employs a holding period of about 15 to 315 minutes, preferably about 15 to 120 minutes, and most preferably about 25 to 65 minutes. The holding temperature is between the melting point of polyester ethylene terephthalate which is approximately 270° C., and the temperature of the onset of rapid nonselective decomposition which is approximately 380° C. Nonselective polyester ethylene terephthalate decomposition increases more rapidly with temperature than the reactions which produce polyvalent metal-terephthalate polymers. Nonselective polyester ethylene terephthalate decomposition gives a wide spectrum of products such as benzoic acid, $CO_2$, CO, benzene, various molecules containing two carbons and residual carbonaceous material and only a small amount of the terephthalic acid. The hold temperature is chosen to maximize yield.

Because of the non-aqueous environment, the reaction runs at substantially lower pressure than for the aqueous process.

The second reaction zone can extend to a still higher temperature which is approximately 520° C. to destroy residual polyester ethylene terephthalate. The second reaction zone may involve combustion of residual organic material to supply heat. If it is desired to retain polyester ethylene terephthalate, or polyvalent metal terephthalates with lower decomposition temperature like the compounds of zinc and iron, an upper limit lower than 520° C. can be employed in the second reaction zone.

It is an object of the present invention to provide a method of making metal-terephthalate polymers from polyester ethylene terephthalate by reacting a polyester ethylene terephthalate with at least one polyvalent metal compound in a non-aqueous melt.

It is yet another object of the present invention to effect such a method with a rising temperature profile that eventually can reach a maximum of approximately 520° C. This temperature completes decomposition of polyester ethylene terephthalate, thus maximizing yield and eliminating polyester ethylene terephthalate as an impurity.

It is a further object of the present invention to provide such a method, wherein the melt phase of the polyester ethylene terephthalate itself can function as a solvent in the method.

It is another object of the present invention to provide heating during an initial portion of the reaction at a controlled rate.

It is a further object of the present invention to employ the addition of other materials such as carbon black to reduce the size of the crystals or fibers.

It is a further object of the present invention to employ polyvalent metals in the form of hydroxides or oxides for introduction into the reaction.

It is still a further object of the invention to produce the metal-terephthalate polymer in the form of small crystals or fibers.

It is yet another object of the present invention to provide such a method which is employable with metals having a double valence or triple valence.

It is another object of the present invention to provide such a process which may be employed in creating the metal-terephthalate polymer from polyester ethylene terephthalate contained in shreds obtained from passenger vehicle tires, together with an added polyvalent metal compound and do to so in a controlled manner.

It is a further object of the present invention to employ the addition of polyester ethylene terephthalate in a tire pyrolysis step, along with addition of polyvalent metal compounds, steam and air.

It is yet another object of the present invention to provide such a process which combines a solid feed of polyester ethylene terephthalate with a solid feed of polyvalent metal compound in a non-aqueous method to produce a solid metal-terephthalate polymer.

It is a further object of the present invention to provide such a method which can be performed at a relatively low pressure.

These and other objects of the invention will be more fully understood from the following detailed description of the invention on reference to the illustrations appended hereto.

DESCRIPTION OF THE PREFERRED EMBODIMENTS

The present invention provides an improved method for the production of metal terephthalate polymers employing polyester ethylene terephthalate along with a polyvalent metal or metal compound to produce a metal-terephthalate polymer. If magnesium hydroxide is employed as the source of the metal compound, reaction (1) provides the starting material for building the long chain metal-terephthalate polymer.

The detailed mechanism may involve the evolution of water from $Mg(OH)_2$ to yield $MgO$, followed by reaction of the evolved water with polyester ethylene terephthalate (PET) to yield reactive ends, followed by reaction of these newly formed reactive ends with $MgO$ and $Mg(OH)_2$, with eventual release of ethylene glycol fragments. This can be summarized by reaction (1).

Figure 1A:
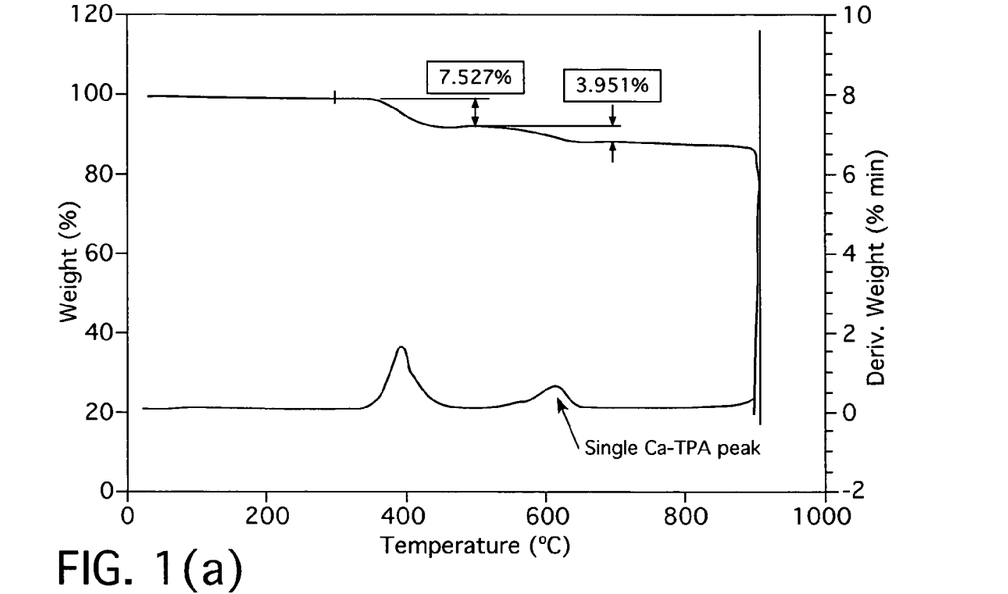
FIG. 1(a) is a plot of temperature versus weight loss from a thermo gravimetric analysis that simulated the metal-terephthalate polymer formation process when a mix of calcium hydroxide and polyester ethylene terephthalate was heated from ambient to 900° C. The temperature in this simulation was raised at 10° C. per minute. This rate of rise is called the "ramp rate."
Figure 1B:
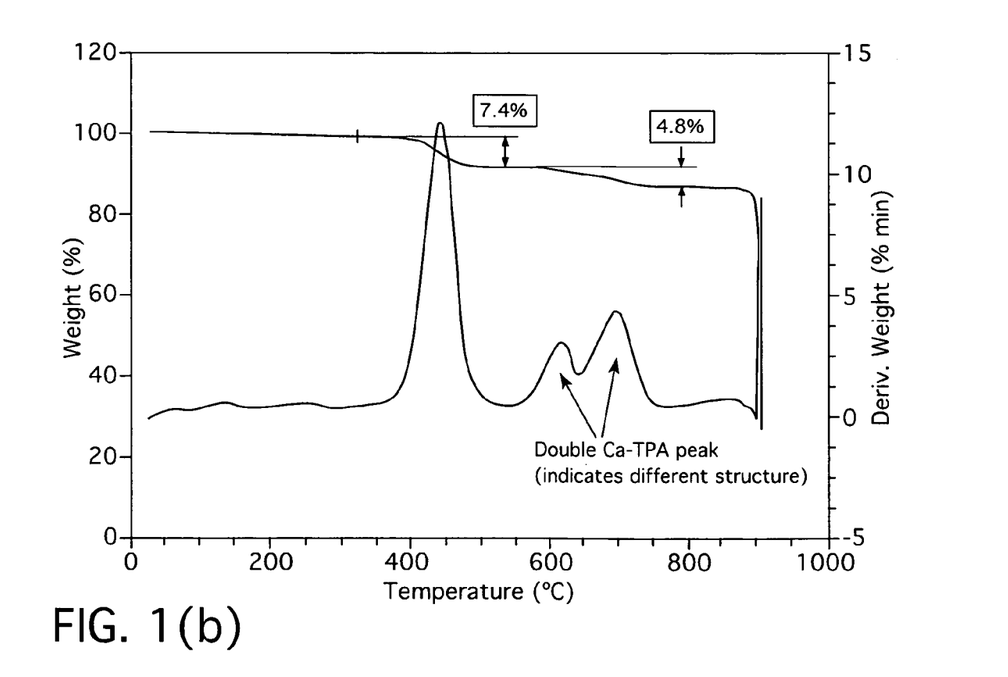
FIG. 1(b) is a plot of temperature versus weight loss employing a 100° C. per minute ramp rate with a mix of calcium hydroxide and polyester ethylene terephthalate.

The higher temperature peak in FIGS. 1(a) and 1(b) is the calcium-terephthalate (Ca-TPA) decomposition peak and the size of the Ca-TPA decomposition peak is a measure of the yield of Ca-TPA during the lower part of the temperature cycle. The lower temperature peak shown in FIGS. 1(a) and 1(b) represents polyester ethylene terephthalate and polyester ethylene terephthalate fragments that did not produce Ca-TPA.

$$Mg(OH)_2 + PET => \sim Mg-[OO-C]-C_6H_4-[C-OO]\sim + \text{ethylene glycol fragments} \quad (1)$$

The long chain polyvalent metal terephthalate polymer then assembles from the shorter pieces formed by reaction (1).

Most of the ethylene glycol fragments are destroyed and leave with the vapor stream, as small molecules such as $CO$, $CO_2$, and $H_2O$, although some end up with the metal-terephthalate product as carbonaceous impurities.

In one embodiment the polyester ethylene terephthalate comes from scrap derived from recycled bottles or fiber.

In another embodiment the polyester ethylene terephthalate comes from virgin sources.

In still another embodiment, shreds from passenger vehicle tires are fed to a pyrolysis process. Pyrolysis is an elevated temperature process by which tires, generally in the form of tire shreds of about 0.25 inch to 3 inches are heated and decomposed to recover fine carbon black material along with other byproducts. The significance of passenger tires is that they typically contain polyester ethylene terephthalate, which is used as reinforcing fiber. Other types of tires that utilize polyester ethylene terephthalate fibers could also be employed. The tire shreds are a convenient source of polyester ethylene terephthalate and are not a necessary part of the invention. In this embodiment, metals or metal compounds are added to enhance the quality of the carbon black by forming metal terephthalates in a controlled manner.

In Example 1, discussed hereinafter, the tire shred feed was supplemented by the addition of magnesium metal. When provided in an elemental form such as the magnesium metal in Example 1, it is believed that the metal reacts with other compounds before reacting with the polyester ethylene terephthalate. Ways that the magnesium metal could be converted to $Mg(OH)_2$ are shown by reactions (2) and (3).

(2)

(3)

Magnesium could be added in still other chemical forms. For example, MgO can be used to make Mg-TPA.

A further embodiment is to combine tire shred feed with a feed of additional polyester ethylene terephthalate, preferably from a scrap supply. Again, selective addition of polyvalent metal or metal compounds such as magnesium hydroxide would be employed. This operation could also be supplemented by steam and air.

Similarly, reaction (1) calcium hydroxide, $Ca(OH)_2$, can be used as shown by reaction (4).

(4)

FIGS. 1(a) and 1(b) introduced the use of thermo gravimetric analysis as a way to simulate the Ca-TPA formation reaction (4).

Thermo gravimetric analysis was used in generating the data of Tables 1, 2.1, and 2.2. The formation of Ca-TPA and Mg-TPA occurs in the lower part of the temperature cycle, up through about 520° C.

Table 1 shows the results of three runs made in the thermo gravimetric analysis device with calcium hydroxide as the source of metal compound, simulating reaction (4). In this case the components calcium hydroxide, polyester ethylene terephthalate and carbon black were placed in the device and the temperature was raised through the range as shown. This is a batch process, but it also simulates a continuous process where the reactants follow this precise temperature versus time profile. Referring to FIGS. 1(a) and 1(b), there is a weight loss peak present between 350° C. and 520° C. This represents decomposition of polyester ethylene terephthalate that did not react with the calcium hydroxide to make Ca-TPA. The higher part of the cycle from about 520° C. to 750° C. carries the metal-TPA through the temperatures at which the Ca-TPA decomposes. The size of a second weight loss peak from about 520° C. to about 750° C. indicates the amount of Ca-TPA that had been made. The percent yield of Ca-TPA from thermo gravimetric analysis process is then estimated from the ratio of the weight loss in the low and high temperature peaks. The thermo gravimetric analysis, therefore, enables both a Ca-TPA formation process and quantitative assessment of yield for that process.

In this discussion, the acronym PET is used for polyester ethylene terephthalate, TGA is used for thermo gravimetric analysis and TPA is used for terephthalate. Thus Ca-TPA stands for calcium terephthalate.

TABLE 1

"Thermo gravimetric Analysis (TGA) Dry Synthesis" Of Calcium-TPA from Polyester Ethylene Terephthalate (PET) and $Ca(OH)_2$ Yields and Decomposition Temperatures"

| "Ramp Rate" Degree C. Minute | Apparent Yield of Calcium-TPA from PET | Peak Decomposition Temperature Degrees C. |
|---|---|---|
| 5 | 36% | 600 |
| 10 | 34% | 620 |
| 100 | 39% | 620 and 700 |

In Table 1, "ramp rate" is simply the heating rate that was used throughout the run. It is the inverse of reaction time. The times are relatively short for this series. For example, with the 100° C. "ramp rate," less than 5 minutes is provided below 520° C.

The percentage yields were determined by weight loss in different temperature ranges found in the thermo gravimetric analysis. See FIGS. 1(a) and 1(b), which are the 10° C. and 100° C. ramp rates respectively. In these runs, the thermo gravimetric analysis device serves as both the reactor and analyzer. The part of the temperature cycle below 520° C. simulates the reactor cycle. The part above 520° C. shows how much of the Ca-TPA compound was made and enables the calculation of yield.

In FIG. 1(a), the weight loss between 520° C. and 750° C. found by thermo gravimetric analysis was 3.951% of the total mass fed. The other peak, which is centered at 390° C., represents decomposition of polyester ethylene terephthalate and polyester ethylene terephthalate fragments. The weight loss in the region was 7.527% of the total mass that was fed.

The Ca-TPA yield for this run is roughly defined by the weight losses in the two peaks. As a result, the apparent yield at the 10° C. ramp rate is 100*3.951/(3.951+7.527), or 34%.

By a similar calculation at 5° C. per minute, the apparent yield was 36 percent, and at 100° C. per minute, it was 39 percent. These "weight-based yields" slightly underestimate molar yield because of changes in molecular weight.

The third column in Table 1 gives the temperatures at which the decomposition of Ca-TPA peaked. The major item of note is that on the 100° C. ramp rate run there are double peaks for the Ca-TPA at about 600° C. and about 700° C. See FIG. 1(b). This suggests that there are two different structures or two different compositions of the Ca-TPA produced at the higher ramp rate. Either could result from the fast ramp rate which would prevent equilibration to the lowest energy state.

Tables 2.1 and 2.2 both report data on $Mg(OH)_2$ rather than $Ca(OH)_2$, simulating reaction (1). Apparent yields in the runs were estimated by the relative size of the weight losses in the different temperature ranges, in the same way as discussed for Table 1.

The distinction between Table 2.1 and Table 2.2 is that Table 2.1 has carbon black present, while Table 2.2 does not.

TABLE 2.1

"TGA Dry Synthesis" Of Mg-TPA from Polyester Ethylene Terephthalate (PET) and $Mg(OH)_2$ Yields and Decomposition Temperatures"

| Molar Ratio $Mg(OH)_2$ to PET | Apparent Yield of Mg-TPA from PET | Peak Decomposition Temperature Degrees C. | |
|---|---|---|---|
| 4 | 20% | 630° C. | 60° C./min ramp rate |
| 3 | 15% | 630° C. | 60° C./min ramp rate |

TABLE 2.1-continued

"TGA Dry Synthesis" Of Mg-TPA from Polyester
Ethylene Terephthalate (PET) and Mg(OH)$_2$ Yields
and Decomposition Temperatures"

| Molar Ratio Mg(OH)$_2$ to PET | Apparent Yield of Mg-TPA from PET | Peak Decomposition Temperature Degrees C. | |
|---|---|---|---|
| 2 | 12% | 630° C. | 60° C./min ramp rate |
| ~1 | 10% | 630° C. | 60° C./min ramp rate |
| ~1 | 19% | 620° C. | 20 minute hold period at 380° C., with 60° C. ramp rate below and above this temperature |

Table 2.1 illustrates the effectiveness of increasing the ratio of magnesium hydroxide, Mg(OH)$_2$, to polyester ethylene terephthalate (PET). The higher ratio of Mg(OH)$_2$ to PET provides more contact surface and increases mass transfer. As metal hydroxide surface is increased, the system equilibrates more quickly.

The second point that Table 2.1 illustrates is the preference for introducing a hold time into the rising temperature sequence in order to optimize yield. The run with the 20 minute hold time gave almost twice the yield as the run with the simple ramp rate. It is contemplated that the hold temperature in the optimized process will be in the range 270° C. to 380° C.

TABLE 2.2

"TGA Dry Synthesis" Of Mg-TPA from Polyester Ethylene
Terephthalate (PET) and Mg(OH)$_2$ without the Addition of
Carbon Black Yields and Decomposition Temperatures"

| Molar Ratio Mg(OH)2 to PET | Apparent Yield of Mg-TPA from PET | Peak Decomposition Temperature Degrees C. | |
|---|---|---|---|
| ~1 | 20% | 660° C. | 20 minute hold period at 380° C., with 60° C. ramp rate below and above this temperature |

Table 2.2 shows that carbon black is not an essential element of the reaction. The higher decomposition temperature may reflect the change in thermal mass of the TGA sample rather than a change in the actual thermal stability of the Mg-TPA produced on this run.

Table 2.2 does not attempt to demonstrate an optimum cycle. The optimum cycle will involve a much longer hold time at a lower temperature than 380° C. to take advantage of the difference in sensitivity of the competing reactions to temperature. Still another variation could involve a fast ramp rate of heating past the melting point of polyester ethylene terephthalate, followed by a hold period at an essentially constant temperature, followed by a different ramp rate to complete the reaction.

It is recognized that other standard reactor configurations can be used in both the continuous and batch modes of operating this invention. For example, rather than a controlled ramp rate, the reactants can all be added to a stirred pot which is held at some desired temperature above the melting point of polyester ethylene terephthalate.

Among the various reaction routes, which may be taken in the synthesis of metal-terephthalate polymer in the context of the present invention, there are many other additional routes, such as reactions (5) and (6).

$$MgO + PET \Rightarrow Mg\text{-}TPA + C_2H_4\!=\!O \qquad (5)$$

$$CaO + PET \Rightarrow Ca\text{-}TPA + C_2H_4\!=\!O \qquad (6)$$

Reaction (5) has been demonstrated in the thermo gravimetric device. Reaction (6) is analogous to Reaction (5), but it has not been attempted in the thermo gravimetric device.

It will be appreciated that the metal-terephthalate polymer may be made employing a wide variety of metals in addition to Mg and Ca. In one embodiment of the present invention, employing non-aqueous synthesis, the metal may be selected from the group consisting of Ca, Mg, Al, Fe, Zn, Sr, and Ba, which commonly exist in a valence state of two or three.

The correspondence between dry synthesis and aqueous synthesis decomposition temperatures for Mg and Ca, shown in Table 3, suggests dry synthesis will be successful on all these materials.

The metals may be provided in an elemental form or in compounds, such as hydroxides, oxides, sulfates, carbonates, and chlorides, for example.

In a more-preferred grouping, a metal selected from the group consisting of Mg, Ca, and Fe may be employed. Where the metal is Mg, it may, for example, be provided as Mg, MgO, MgCO$_3$, MgSO$_4$, and Mg(OH)$_2$. Where the metal is Ca, it may preferably be provided in the form of CaO, CaCO$_3$, CaSO$_4$, and Ca(OH)$_2$. Fe, for example, could be fed as Fe, FeO or Fe$_2$(O$_3$,) or Fe(OH)$_2$.

As shown by Table 3, polyvalent metal terephthalates are metallic polymers which generally have an upper temperature stability limit on the order of 600° C. to 700° C. which is much higher than polyester ethylene terephthalate, which decomposes in the range of 350° C. to 520° C. The exceptions in Table 3 are iron and zinc which form metal terephthalates which decompose in a range that overlaps with polyester ethylene terephthalate.

TABLE 3

Decomposition Temperatures Of Metal-TPA Polymers
All values are based on weight loss peak in thermo gravimetric analysis (TGA).
Different TGA techniques, such as differences in ramp rate and material of sample
holders, cause variation in values.

| Metal | This Work Dry Synthesis Degrees C. | This Work Aqueous Synthesis Degrees C. | Aqueous Synthesis U.S. Pat. No. 4,952,634 | Comment |
|---|---|---|---|---|
| Mg | 640 620 to 660 | 610 to 640 | 625 | See Example 1 Peak identified in carbon black product |

TABLE 3-continued

Decomposition Temperatures Of Metal-TPA Polymers
All values are based on weight loss peak in thermo gravimetric analysis (TGA).
Different TGA techniques, such as differences in ramp rate and material of sample
holders, cause variation in values.

| Metal | This Work Dry Synthesis Degrees C. | This Work Aqueous Synthesis Degrees C. | Aqueous Synthesis U.S. Pat. No. 4,952,634 | Comment |
|---|---|---|---|---|
| Ca | 600 to 700 | 620 and 760 | 620 | from demonstration scale tire pyrolysis. See Example 2 and Tables 2.1 and 2.1 See Table 1 and FIGS. 1(a) and 1(b) Two peaks observed |
| Al | | 380, 600 and 630 | 540 | Two peaks observed Three peaks observed Major peaks are 600 and 630 |
| Fe | | 500, 630, and 710 | | Three peaks observed 500 was the major peak |
| Zn | | 510 to 540 The difference resulted from using two different sample pans | 430 | 510 and 540 are believed to be more accurate than the value of 430 from Patent No. 4,952,634 |
| Sr | | | 630 | |
| Ba | | | 640 | |

The process of this invention is normally carried out at a temperature between a lower temperature of about 270° C. and a higher or upper limit temperature of about 520° C.

The 520° C. temperature is set by the desire to decompose residual polyester ethylene terephthalate while staying below the decomposition temperature of the metal-TPA. For the embodiments that feed polyester ethylene terephthalate together with Mg, Ca, Al, Ba, or Sr this does not present a problem.

Both Zn-TPA and Fe-TPA, however, undergo significant decomposition when the temperature is raised to 520° C., and hence if these are desired, the value for the high temperature should be reduced to approximately 450° C. Zn-TPA and Fe-TPA peaks overlap with that of polyester ethylene terephthalate, and as a result, some polyester ethylene terephthalate will be left as an impurity in order for the Fe-TPA and Zn-TPA to survive.

For the embodiment that feeds tire shreds, it is expected that some Fe-TPA and Zn-TPA may be present. However there were no sharp peaks found on thermo gravimetric analysis of the pyrolysis product at the expected temperatures for these metal terephthalates. Metal-terephthalates have not been reported in the prior art as being present in the product of tire pyrolysis.

Referring once again to FIG. 2, there is shown a primary reactor 2 which contains the first reaction zone. In one embodiment of the method, tire scrap 4 plus a metal compound 6 are fed into the primary reactor.

Figure 2:
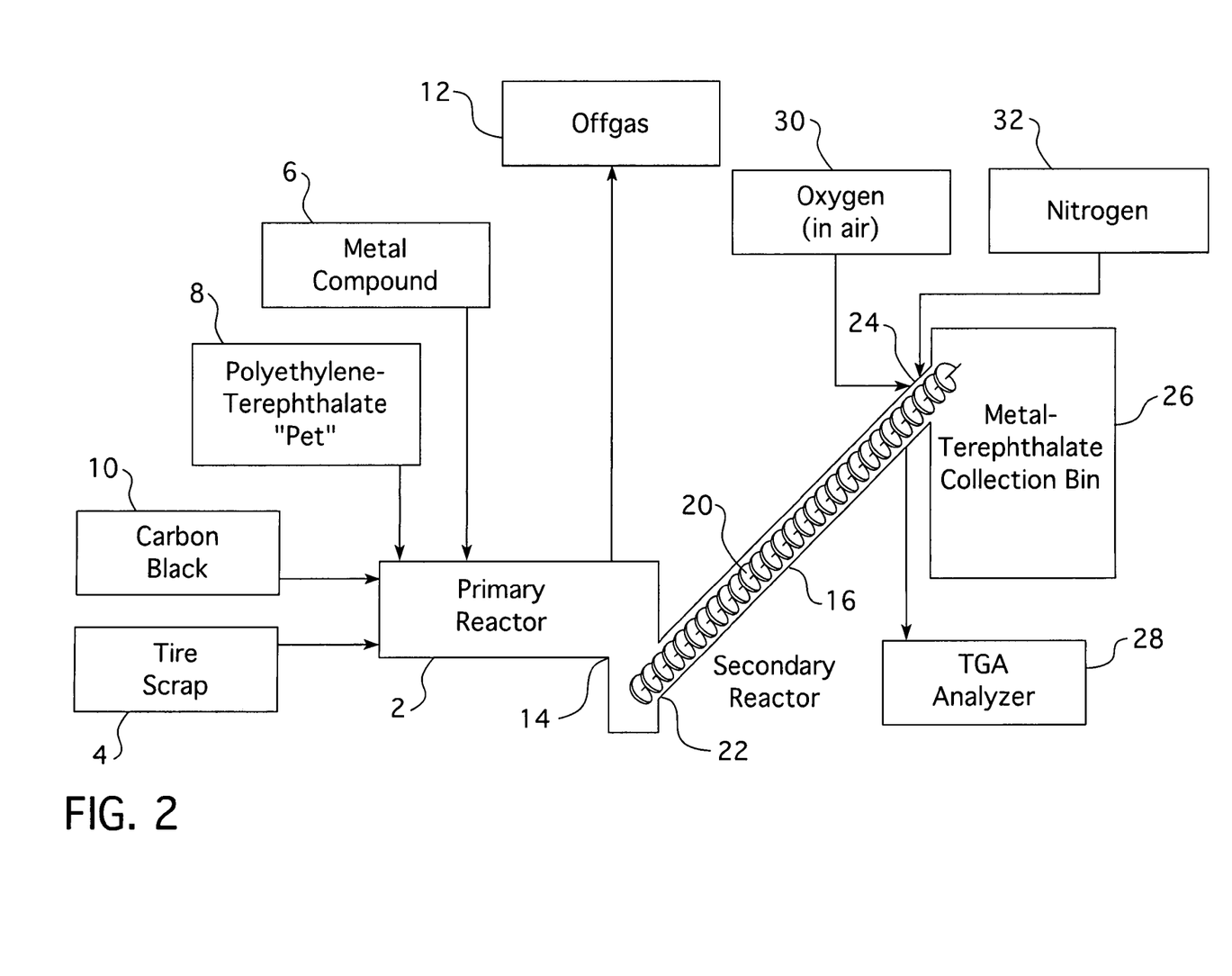
FIG. 2 is a schematic illustration of one embodiment of the method of the present invention showing portions of the larger apparatus.

The primary reactor 2 serves to mix the reactants and heat them to a temperature where the metal compounds react with the polyester ethylene terephthalate.

In one embodiment, polyester ethylene terephthalate 8 is fed in the absence of tire shreds. Polyester ethylene terephthalate could be virgin polymer or recycled scrap, such as obtained from containers or fibers, for example. The metal compound may be provided in any of the above-described forms. It can be supplemented by carbon black 10. The use of carbon black from supply 10 can serve to reduce the size of the crystals produced by the reaction.

In this primary reactor 2, a major portion or substantially all of the conversion to metal-terephthalate polymer takes place. A hold time is provided to facilitate this conversion. The hold time in the first reaction zone 2 is preferably at a temperature between 270° C. and 380° C. with the hold time being about 10 minutes to 300 minutes. It is preferred that the process be operated at a low pressure, such as in the range of about 5 to 30 psia, and preferably, about 10 to 15 psia. The low pressure operation is enabled by the non-aqueous environment. The higher end of this range would preferably be used if the hold time is within the higher end of its temperature range. An off gas 12, which may be a mix of nitrogen, oxygen, carbon monoxide, carbon dioxide, water vapor, and fragments from polyester ethylene terephthalate decomposition, such as benzoic acid, benzene, and methane, as well as various molecules containing two carbon atoms, emerges from the primary reactor 2. The exit end 14 of the primary reactor 2 communicates with the secondary reactor 16. The reaction product preferably enters secondary reactor at a temperature of about 350° C. to 400° C. The reaction product of reaction in the primary reactor 2 is delivered to the second reactor 16 as a flowable semi-solid.

In a preferred form, a helical conveyor 20 serves to move the reaction product received from primary reactor 2 from the entry end 22 of the secondary reactor 16 toward the toward the exit end 24 of the secondary reactor. The helical conveyor 20 preferably has a variable speed. The secondary reactor preferably slopes upwardly from the entry end 22 to the exit end 24. The metal-terephthalate polymer is delivered to a storage bin 26 or may be directly transported to a desired location. The thermo gravimetric analyzer (TGA) 28 serves to remove samples of the reaction product and provide a detailed analysis thereof. This analyzer is employed to determine the purity of the metal-terephthalate polymer. In a further, preferred aspect of the invention, oxygen 30 is introduced into the secondary reactor 16 at a position spaced from the entry end 22 in order to provide countercurrent flow with respect to the direction of movement of the reaction product introduced through entry end 22. The oxygen may be provided as pure oxygen or oxygen in air. The oxygen or oxygen in air serves to react with residual fragments from the polyester ethylene terephthalate and strip other polyester ethylene terephthalate fragments from the reaction products and return them to the primary reactor 2. The oxygen or oxygen in air serves to provide energy by reacting with the residual polyester ethylene terephthalate fragments and other combustible species to burn the same and release heat. If desired, steam may be introduced into the second reactor 16 along with the air to help cool the reaction products, as well as to aid the reactions. The steam, if used, would be at a volumetric rate of about 10 percent to 100 percent of the combined air and nitrogen rates. The air introduction at ambient temperature is the primary way of cooling the reaction product from the secondary reactor 16. The secondary reactor temperature will normally reach a maximum temperature in the range of about 400° C. to 600° C., and preferably, 450° C. to 500° C. It will be appreciated that the auger 20 in the secondary reactor controls residence time and contact between gases and product. The heating from combustion in the secondary reactor 16 may be supplemented by other means, such as microwaves or electric art discharge, if desired.

Nitrogen 32 is introduced for safety purposes. The reaction of the method produces metal-terephthalate polymer in crystalline form and having a width from about 0.1 microns to 0.25 microns. The crystals tend to be elongated and friable. The length of the crystals is generally in the range of 5 microns to 10 microns. Because of the relatively high aspect ratio the crystals can be described as fibers. It will be appreciated that the process may be performed as a continuous process, such as is exemplified by FIG. 2, or if desired, as a batch process.

While the foregoing has, for simplicity of disclosure, made reference to a single metal being employed in the reaction, it will be appreciated that combinations of metals may be employed in the same reaction. In the first reactor 2, the initial mixing is accomplished, preferably before the polyester ethylene terephthalate has melted, which is at about 270° C., and below the temperature at which polyester ethylene terephthalate starts to decompose at a significant rate. The first reactor 2 has a high degree of completion of the reaction between the metal and the polyester ethylene terephthalate to produce the metal-terephthalate polymer. It is desirable for effecting efficient mixing and reaction to have internal agitation and baffling in a manner well-known to those skilled in the art.

In the secondary reactor 16, the stripping of random polyester ethylene terephthalate fragments from the reaction product is accomplished. The countermixing flow of air and nitrogen strips a wide variety of volatile material and recycles it back into the primary reactor 2. Some of the recycled material is captured by contact with the paste in the primary reactor. The secondary reactor 16 also permits burn off of impurities, such as carbonaceous deposits, which will burn at approximately 500° C.

The secondary reactor 16 may be heated by combustion of carbonaceous deposits and polyester ethylene terephthalate fragments. If desired, supplemental heating may be employed when tire shreds are not used.

With regard to the off gas outlet 12, it could be released to a flare, or if economically feasible, the off gas, which is primarily nitrogen, could be routed to a cooling system.

It will be appreciated that the present non-aqueous method reacts two solids, polyester ethylene terephthalate and a metal or metal compound, to produce a third solid, metal-terephthalate polymer.

In another embodiment, tire scrap 4 plus a metal compound 6 are fed into the primary reactor. In this embodiment polyester ethylene terephthalate 8 is also fed into the primary reactor 2. It will be appreciated that the tire scrap provides carbon black and polyester ethylene terephthalate. When tire scrap is fed, the tire pyrolysis reaction takes place in reactor 2. Pyrolysis occurs over a wide range of temperatures between 150° C. and to 500° C. The upper end of the range is influenced by the amount of volatiles left behind, and can be below 400° C. in some cases.

In order to provide enhanced disclosure of the invention, examples will be considered.

EXAMPLE 1

Demonstration Scale, Discovery of Magnesium Terephthalate Made from Magnesium and Tire Shreds Passenger vehicle tire shreds of approximately one inch diameter were fed to a continuous pyrolysis process. The tire shreds came from a variety of sources but are believed to have contained 3 to 4 percent polyester tire cord, which was present for reinforcement in the original tires. Approximately 60 percent of the mass in tire shreds was elastomeric polymer, and approximately 35 percent of the mass was carbon black. The feed mass also contained a small amount of steel which was a remnant from the steel used to reinforce the tire, calcium compounds used as whitening agents in the original tire and zinc which was used as a vulcanization aid. In addition for the runs of Example 1, a mix of magnesium and aluminum metal powders was fed with each of these metals approximately 0.3 weight percent of the total feed. The relatively-high concentration of magnesium was unusual for tire pyrolysis. During pyrolysis the elastomeric polymer was converted to oil and gas which were removed. Carbon black concentrated and eventually became the primary product. The concentrations of aluminum, magnesium, steel, calcium carbonate, zinc, and other inorganic components also increased. The various metals also changed chemical form in the pyrolysis environment, which included oxidation and reduction regions, as well as water vapor and sulfur compounds, that evolved from the process. Measurements of the carbon black product showed that essentially all the aluminum was still present as metal powder in the product, but about 50 percent of the magnesium had reacted to other compounds. Magnesium-terephthalate was identified as one of these compounds based on its large peak at 640° C. on thermo gravimetric analysis. On some runs, the carbon black product contained magnesium-terephthalate at 1 to 2 weight percent of the recycle carbon black product. The sharp peak at 640° C. disappeared when magnesium was removed from the feed. No other sharp peaks were observed except for polyester ethylene terephthalate which was present on low temperature pyrolysis runs, although there was a much smaller hump around 500° C. which may have been a mix of iron and zinc terephthalates. When a balance was made on the higher temperature runs, the molar yield of magnesium-terephthalate from moles of polyester ethylene terephthalate in the original tire shreds was estimated to have been between 20 to 40 percent. At one point in the pyrolysis process, a melt phase was observed. This led to confirmation of the fact that the method of the present invention was a new, general method to synthesize polyvalent metal-terephthalates by reacting molten polyester ethylene terephthalate with a magnesium compound.

EXAMPLE 2

Thermo Gravimetric Analysis Simulation of Batch Process—Magnesium Terephthalate from Magnesium Hydroxide and Polyester Ethylene Terephthalate—without Carbon Black Example 1 and the first series of runs in the thermo gravimetric analyzer all had carbon black present and it was unknown whether the carbon black was a necessary material for the process. Also, clear pictures of the crystals that were formed could not be obtained as long as carbon black was present.

Example 2 is based on the run shown in Table 2.2. It demonstrated that high yield of magnesium terephthalate can be obtained from magnesium hydroxide without the presence of carbon black.

Magnesium hydroxide and polyester ethylene terephthalate were placed in a platinum pan in a thermo gravimetric analyzer. The mix was 82.4 weight percent polyethylene terephthalate and 17.6 weight percent magnesium hydroxide. This gave a calculated molar ratio of magnesium hydroxide to polyester ethylene terephthalate of 0.7. The sample was heated at a rate of 60° C. per minute to 380° C. The temperature was held at 380° C. for 20 minutes and then heating was resumed at the rate of 60° C. per minute to 850° C. The weight loss between 520° C. and 750° C. was 14 percent. The weight loss in this region measured the amount of magnesium terephthalate made in the lower temperature part of the cycle. After correcting for the loss of magnesium oxide from magnesium terephthalate in the 520° C. to 750° C. range, the effective molecular weight of the decomposed molecule dropped to 148. When this was compared to the polyester ethylene terephthalate fed, which has an effective molecular weight of 192, the molar yield becomes 14/148, divided by 82.4/192. The molar yield was calculated to be 22 percent. This is slightly higher than the value calculated from the weight losses, which is reported in Table 2.2. Crystals were obtained from a similar run to that described in Example 2, which again did not have carbon black present, but where the heating was stopped at 380° C. The crystals were studied by microscopy. The crystals were found to be in the range of 0.1 to 0.25 micron in the smallest dimension and approximately 5 to 10 microns in maximum dimension. This is much smaller than reported by the prior art.

One embodiment of the present invention is a combination of Examples 1 and 2 which involves a tire shred feed augmented by additions of a metal compound and polyester ethylene terephthalate scrap to produce a carbon black product enriched in small metal terephthalate crystals for use as an additive in rubber compounding or Nylon molding resin, for example.

Whereas particular embodiments of the invention have been described herein for purposes of illustration, it will be evident to those skilled in the art that numerous variations of the details may be made without departing from the invention as set forth in the appended claims.

What is claimed is:

1. A method of making a metal-terephthalate polymer from polyester ethylene terephthalate comprising:
    establishing said metal-terephthalate polymer by reacting said polyester ethylene terephthalate with at least one material selected from the group consisting of polyvalent metal and a metal compound in a first reaction zone which provides a non-aqueous melt environment at temperatures between about 270° C. and 380° C., and
    subsequently introducing the reaction product of said first reaction zone into a second reaction zone for processing at about 400° C. to 600° C.

2. The method of claim 1 including getting to said first reaction zone temperatures at a ramp rate of about 10° C. per minute to 100° C. per minute.

3. The method of claim 2 including
    said ramp rate portion of said reaction occupying about 5 percent to 50 percent of said reaction time.

4. The method of claim 1 including
    said reaction taking about 15 to 315 minutes.

5. The method of claim 1 including
    said reaction taking about 25 to 65 minutes.

6. The method of claim 1 including
    providing said metal compound in the form of a metal hydroxide.

7. The method of claim 1 including
    selecting said metal from the group consisting of Ca, Mg, Al, Se, Fe, Zn, Sr, and Ba.

8. The method of claim 1 including
    selecting said metal from the group consisting of Mg, Ca, and Fe.

9. The method of claim 1 including
    employing magnesium as said metal.

10. The method of claim 1 including
    employing calcium as said metal in the form of a compound selected from the group consisting of CaO, $CaCO_3$, $CaSO_4$, and $Ca(OH)_2$.

11. The method of claim 1 including
    employing Fe as said metal.

12. The method of claim 1 including
    employing passenger vehicle tires as the source of said polyester ethylene terephthalate.

13. The method of claim 12 including
    employing said passenger vehicle tires in the form of tire shreds.

14. The method of claim 12 including
    adding Mg as said metal and making $Mg(OH)_2$ and MgO in situ.

15. The method of claim 12 including
    adding a metallic compound and reacting it with said polyester ethylene terephthalate to produce said metal-terephthalate polymer.

16. The method of claim 1 including
    adding said metal in a form selected from the group consisting of the metal, a metal oxide, a metal oxide precursor, and a metal carbonate.

17. The method of claim 16 including
    making said metallic compound oxide or hydroxide in situ from a material selected from the group consisting of a carbonate, a sulfide, a sulfate, and a metallic material.

18. The method of claim 1 including creating by said method a metal-terephthalate polymer crystalline material.

19. The method of claim 18 including creating said metal-terephthalate polymer in elongated friable crystals.

20. The method of claim 19 including
    adding carbon black to said reaction in order to further reduce the size of said metal-terephthalate polymer crystals produced by said reaction.

21. The method of claim 1 including
    said reaction employing carbon black from said tire shreds to facilitate said reaction and subsequent crystal formation.

22. The method of claim 1 including
completing said method at a temperature from about 450° C. to 500° C.

23. The method of claim 1 including
completing said method at a temperature below 520° C.

24. The method of claim 1 including
effecting said reaction at a pressure of about 5 psia to 30 psia.

25. The method of claim 1 including
effecting said reaction at a pressure of about 10 psia to 15 psia.

26. The method of claim 1 including
initiating said reaction in a first reaction zone and completing the reaction in a second reaction zone.

27. The method of claim 26 including
injecting oxygen into said second reaction zone.

28. The method of claim 1 including
employing said method as a continuous process.

29. The method of claim 1 including
employing said process as a batch process.

30. The method of claim 27 including
effecting said oxygen introduction into said second reaction zone in a counterflow direction with respect to the direction from which materials enter said second reaction zone from said first reaction zone.

31. The method of claim 27 including
introducing said oxygen in air, and
said oxygen introduction serving to heat said second reaction zone in order to react with residual fragments from polyester ethylene terephthalate and strip other polyester ethylene terephthalate fragments from reaction products.

32. The method of claim 27 including
effecting said oxygen injection in air to provide energy by reacting with residual polyester ethylene terephthalate fragments.

33. The method of claim 30 including
effecting by said air introduction cooling of the reaction product due to counterflow of air to exiting product.

34. The method of claim 33 including
introducing steam into said second reaction zone along with air to cool the reaction products and facilitate reactions at a volumetric rate that is about 10 percent and 100 percent of the combined air and nitrogen rates.

35. The method of claim 1 including
said first reaction zone heated at a ramp rate of about 10° C. per minute to 100° C. per minute, and
providing a hold temperature in the range of about 270° C. to 380° C.

36. The method of claim 35 including
providing a hold time in said first reaction zone of about 10 minutes to 300 minutes.

37. The method of claim 35 including
said hold time being about 15 minutes to about 120 minutes.

38. The method of claim 35 including
said hold time being about 20 minutes to 60 minutes.

39. The method of claim 26 including delivering the reaction product from said pyrolysis to said second reaction zone as a flowable semi-solid.

40. The method of claim 1 including
employing as a polyester ethylene terephthalate source at least one material selected from the group consisting of polyester ethylene terephthalate bottles and polyester ethylene terephthalate fibers.

41. The method of claim 9 including
employing as a metal source at least one material selected from the group consisting of Mg, MgO, $MgCO_3$, $MgSO_4$, and $Mg(OH)_2$.

42. The method of claim 8 including
employing as a metal source at least one material selected from the group consisting of CaO, $CaCO_3$, $CaSO_4$, and $Ca(OH)_2$.

43. The method of claim 26 including
completing the production and purification of metal-terephthalate polymer in said second reaction zone.

44. The method of claim 39 including
said reaction product entering said second reaction zone at about 350° C. to 400° C.

45. The method of claim 43 including
returning unreacted polyester ethylene terephthalate fragments from said second reaction zone to said first reaction zone with the gases from second reaction zone.

46. The method of claim 26 including
returning from said second reaction zone to said first reaction zone air employed to heat said second reaction zone.

47. The method of claim 32 including
employing an auger in said second reactor zone to control residence time and move the reaction product countercurrent to the injected air.

48. The method of claim 1 including
monitoring of polyester ethylene terephthalate and metal-terephthalate polymer in the reaction product by thermo gravimetric analysis to determine purity of metal-terephthalate polymer reaction product.

* * * * *